United States Patent Office 3,201,298
Patented Aug. 17, 1965

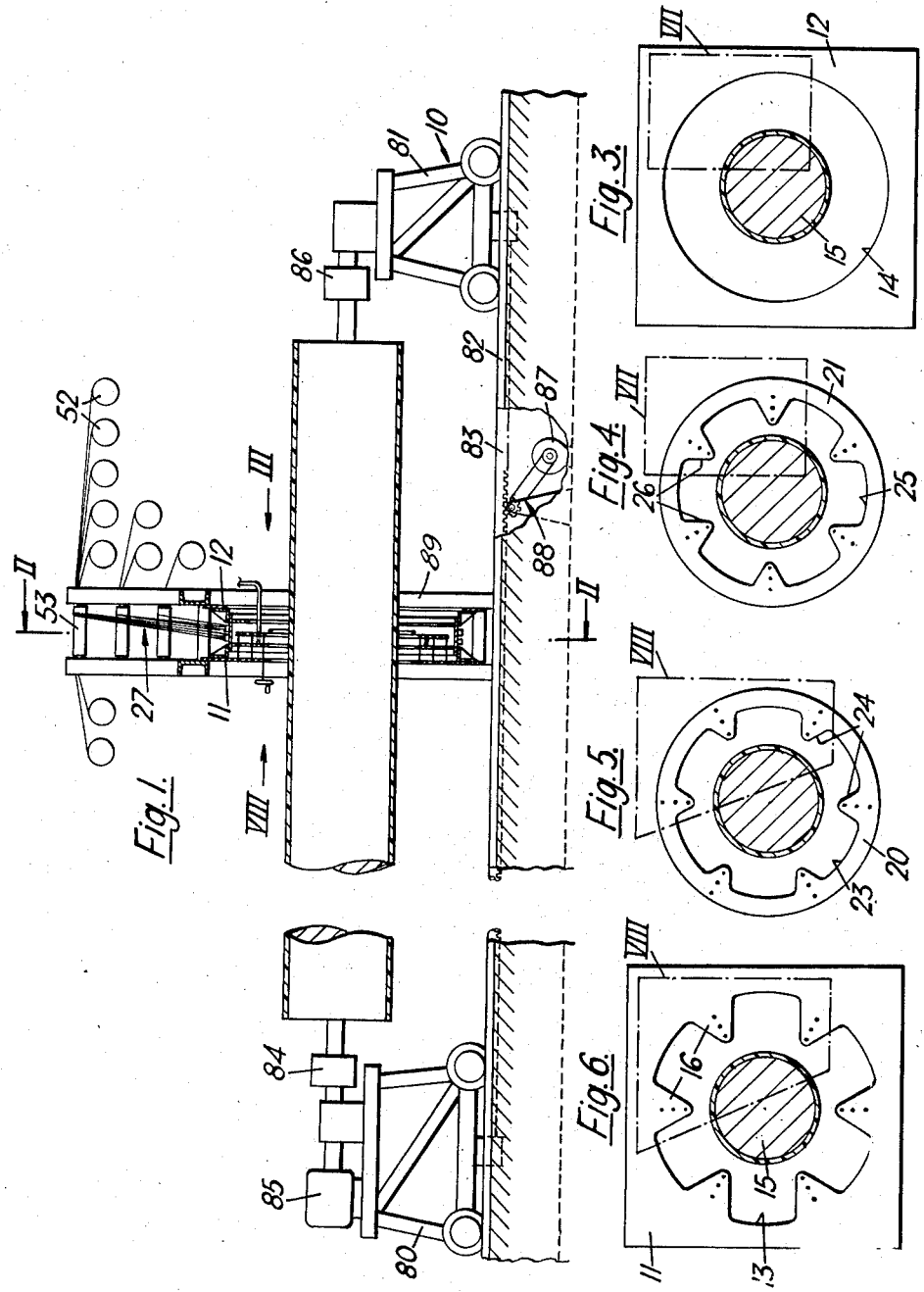

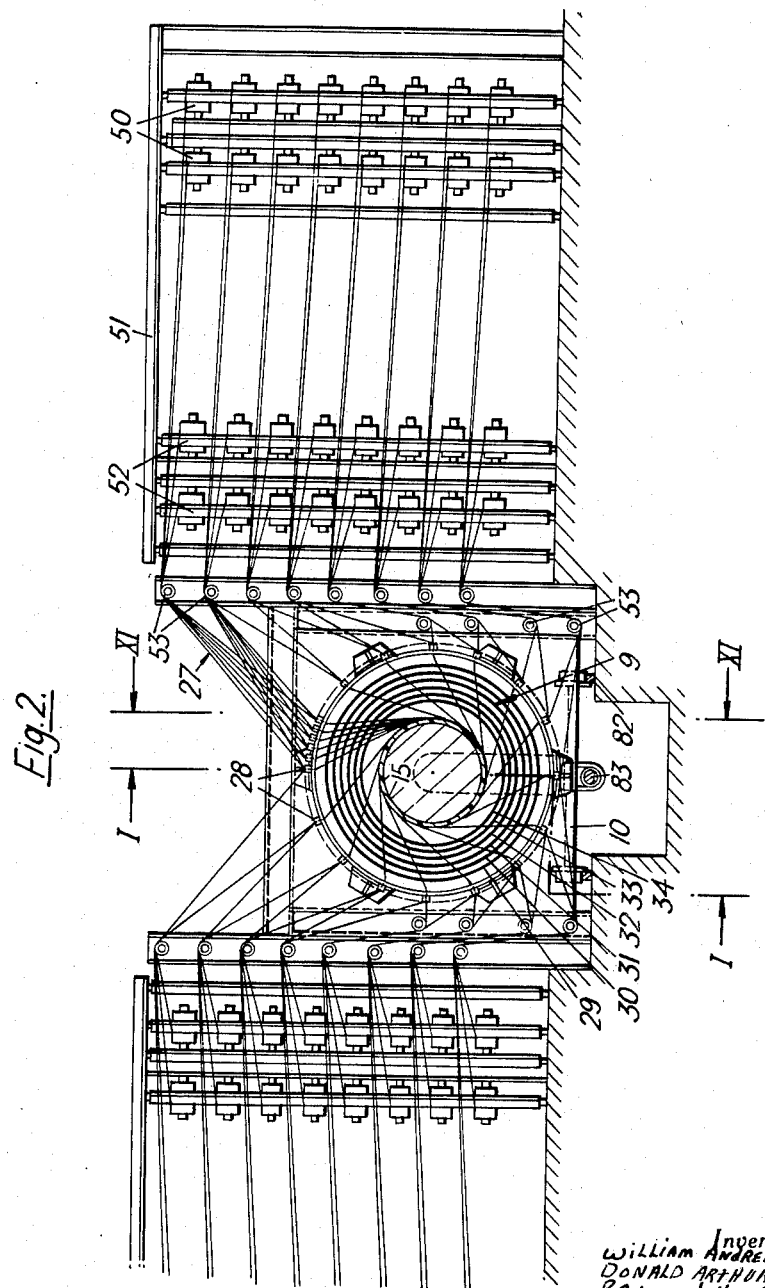

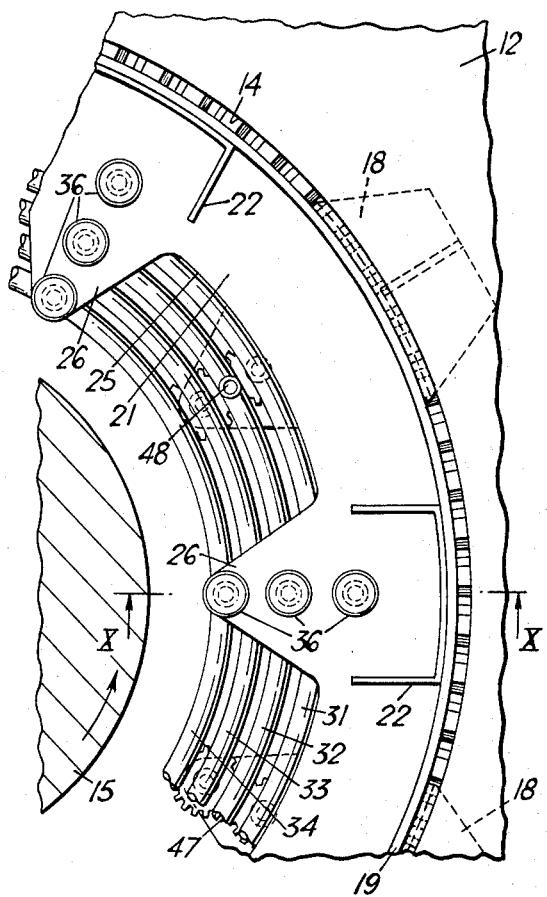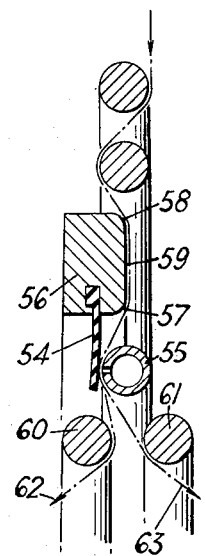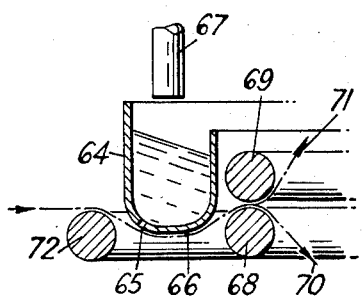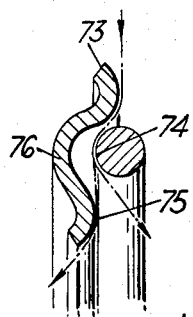

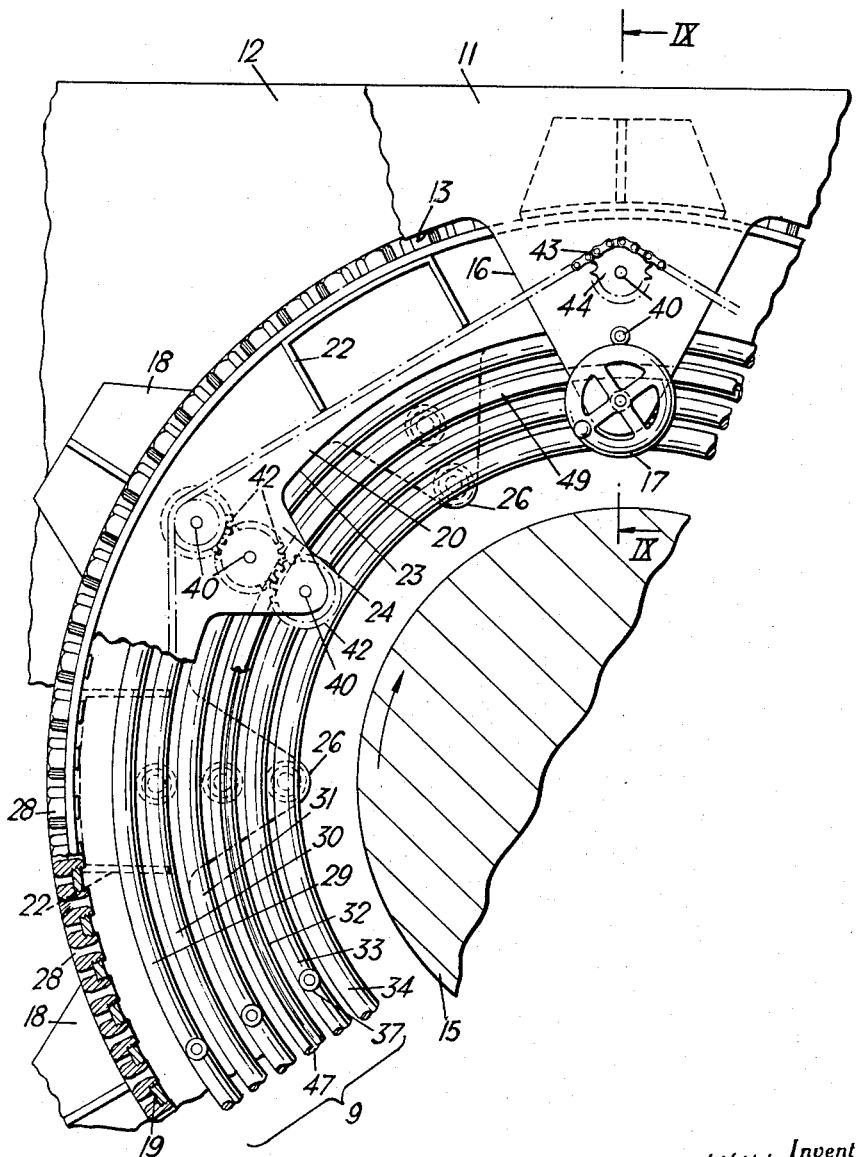

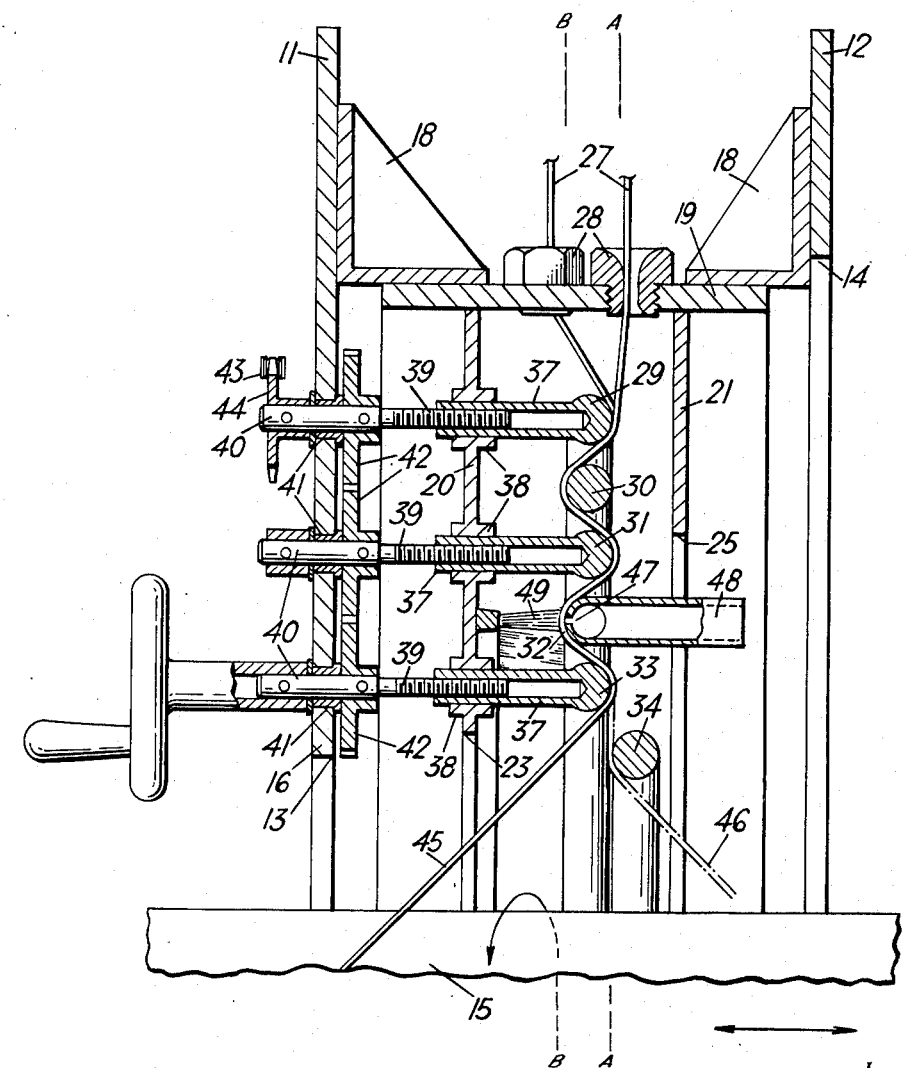

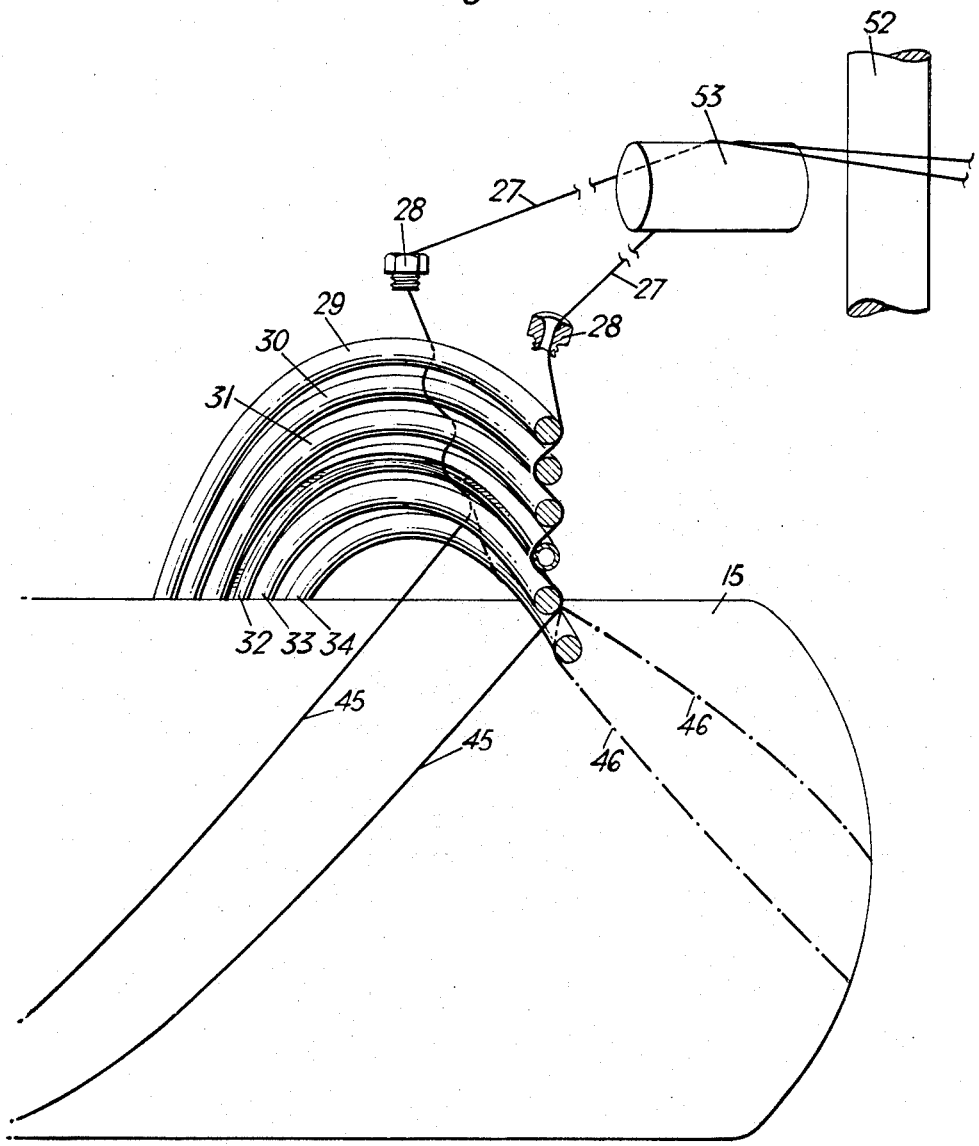

3,201,298
APPARATUS FOR HELICAL WINDING OF A PLURALITY OF THREADS
William Andrew Baker, Donald Arthur Shoemack, and Raymond Harold Richens, Bristol, England, assignors to Bristol Aeroplane Plastics Limited, Bristol, England, a British company
Continuation of application Ser. No. 812,175, May 11, 1959. This application Aug. 29, 1963, Ser. No. 305,299
Claims priority, application Great Britain, May 16, 1958, 15,825/58
10 Claims. (Cl. 156—431)

This is a continuation of application Serial No. 812,175, filed May 11, 1959, and now abandoned.

This invention relates to the winding of a number of threads simultaneously upon a mandrel for the purpose of producing thereon a covering composed of helical or approximately helical turns of thread, and particularly concerns thread guides for the purpose of finally guiding the threads, drawn from packages carried by a support, on to the surface of the mandrel to be covered.

The invention is in the same general field as the De Ganahl Patent No. 2,714,414 and is specifically intended to be used as an improvement in the apparatus for making fibre-reinforced resin pipes as described in Baker et al, Patent No. 3,032,461.

A thread guide according to this invention comprises annular guide surfaces coaxial with the mandrel. Preferably there are at least three guide surfaces, two of which are of different diameters and face axially in one direction, and the third of which faces axially in the opposite direction and is at least as small in diameter as the greater of the two and is at least as great in diameter as the lesser of the two. The relative positions of the thread guide, the mandrel, and packages of thread is such that threads can be led from the packages to the mandrel and pass along sinuous paths in contact with guide surfaces.

During winding, the mandrel lies with its axis along the common axis of the guide surfaces, and the thread guide and mandrel move axially and rotate with respect to each other. The deflection of the threads in sinuous paths causes them to become tensioned and assists in keeping them evenly distributed around the thread guide.

There may be more than three annular guide surfaces; that is to say there may be one or more further guide surfaces facing in the same direction as the two, and there may be one or more further guide surfaces facing in the opposite direction.

To permit the degree of tensioning to be adjusted, at least one of the guide surfaces may be arranged to be adjustable in the axial direction.

Preferably, in order to facilitate the operation of initially setting up the threads, the guide surfaces facing oppositely may be arranged to be separable axially sufficiently to allow threads to be passed in straight paths inwardly between them.

Preferably one of the guide surfaces is formed with a continuous circumferential slit or a series of closely spaced holes through which a liquid or paste-like substance may be fed so as to be picked up by threads passing over the guide surface. For this purpose at least two guide surfaces are required, facing axially in opposite directions.

These features will all be explained in more detail with reference to examples of thread guides according to this invention which are shown in the accompanying drawings. In these drawings:

FIGURE 1 is a diagrammatic longitudinal section of the apparatus, the line of section being shown at I—I in FIGURE 2;

FIGURE 2 is a diagrammatic cross section of the apparatus on the line II—II in FIGURE 1;

FIGURES 3 to 6 are rear elevations of four mounting plates, viewed in the direction of the arrow III in FIGURE 1;

FIGURE 7 is a rear elevation, enlarged, of part of the thread guide, viewed in the direction of the arrow III in FIGURE 1 and corresponding to the parts of the plates contained within the outlines VII in FIGURES 3 and 4;

FIGURE 8 is a front elevation, enlarged, of part of the thread guide, viewed in the direction of the arrow VIII in FIGURE 1, and corresponding to the parts of the plates contained within the outlines VIII in FIGURES 5 and 6, portions of various components being broken away to show others;

FIGURE 9 is a section of parts of the thread guide on the line IX—IX in FIGURE 8, which corresponds to the upper part of the line I—I in FIGURE 2;

FIGURE 11 is a diagram illustrating the paths of two threads;

FIGURES 12 and 13 are diagrams, corresponding to parts of FIGURE 9, showing two other forms of thread guide; and FIGURE 14 is a diagram of a thread guide for use with a mandrel mounted with its axis vertical.

Figure 10:
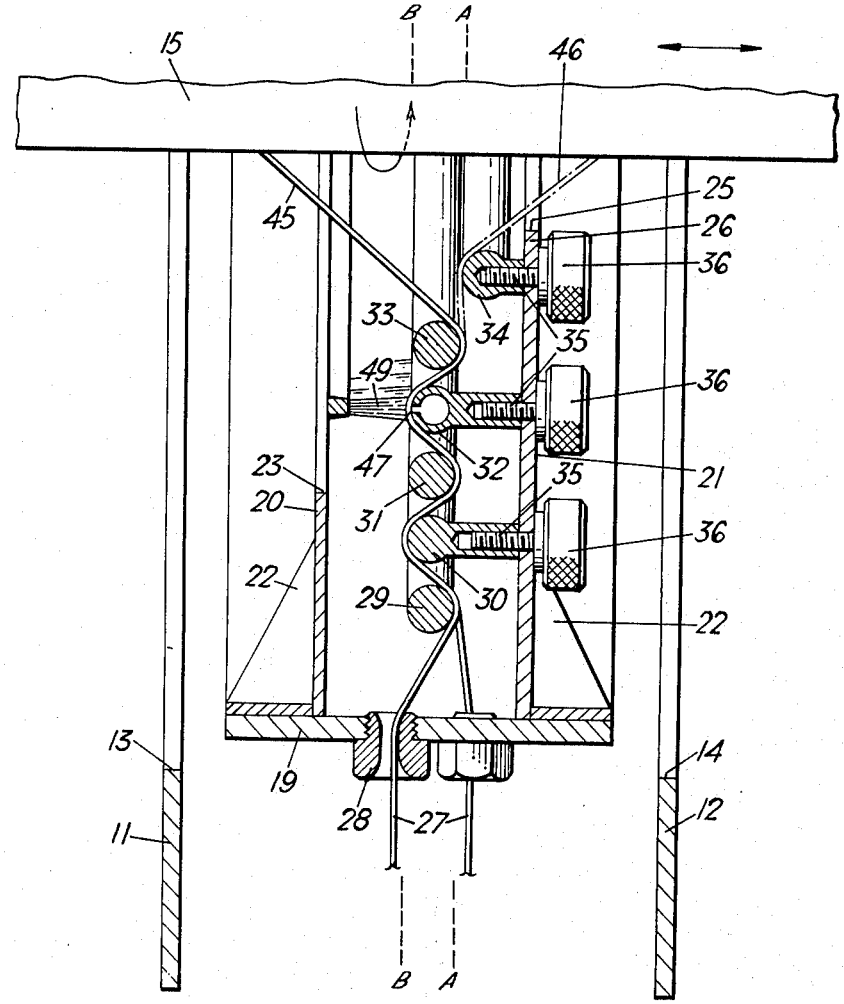
FIGURE 10 is a section, similar to FIGURE 9, on the line X—X in FIGURE 7.

The thread guide 9 shown in FIGURES 1 to 11 is incorporated in a thread winding machine including a carriage 10 (FIGURES 1 and 2) arranged to reciprocate a mandrel 15 axially through the guide and at the same time to rotate the mandrel, the guide remaining stationary. The carriage 10 consists of two trolleys 80 and 81 running on rails 82 and joined by a bar 83. The trolley 80 supports a headstock 84 driven by a motor 85. The trolley 81 supports a tailstock 86. The mandrel 15 is removably mounted on the headstock and tailstock. The carriage can be shifted axially by a motor 87 and drive 88. The speeds and directions of rotation of the motors are individually controllable by known means.

The thread-guiding parts proper are supported relatively to other parts of the winding machine by a main structure 89 which includes two square plates 11 and 12 spaced apart in the direction of the axis of the winding machine and provided with apertures 13 and 14 (these reference characters being connected by lead lines to the peripheries of the apertures) through which the mandrel 15 may pass. The aperture 14 of the plate 12 is a plain circle (FIGURE 3), but the plate 11 has six approximately triangular extensions 16 (all of which are shown in FIGURE 6, but only one of which is shown in FIGURE 8) into its aperture, serving to support an adjusting handwheel 17 and other parts described below. The plate 11 will be referred to as the front plate and the plate 12 as the back plate.

The front and back plates are connected in spaced relation by a number of brackets 18 and a tubular plate 19 (FIGURES 1, 9 and 10). Two apertured discs 20 and 21 (FIGURES 5 and 4) are spaced apart within the tubular plate 19 and are connected to the latter by brackets 22. The aperture 23 of the disc 20 (the periphery of which is indicated by the lead line) departs from the circular by six triangular extensions 24 which are arranged in alignment with the six extensions 16 of the front plate, while the other disc 21 has an aperture 25 (the periphery of which is indicated by the lead line) and six similar but rather larger triangular extensions 26 which lie opposite the spaces between the extensions 24. The parts so far described substantially complete the main structure.

The apparatus may be used to wind a plurality of layers of helical turns of thread onto the mandrel, each layer consisting of a considerable number of threads. In making fibre-reinforced resin pipes, the threads are impregnated with resin, preferably as the threads are approaching the mandrel. When the winding has been completed, the mandrel with the threads on it is removed from the machine and subjected to conditions for curing the resin. Thereafter the pipe is removed from the mandrel.

The threads, indicated at 27, are drawn from packages in the form of cheeses 50 (FIGURES 1 and 2) mounted in a creel 51. The threads pass round guide rods 52 and 53 and thence through a large number of hollow fairleads 28 which are screwed into holes in the tubular plate 19 and are thus fixed axially. The threads then pass to the mandrel through the thread guide 9, which consists of six circular-sectioned rings 29 to 34 of progressively decreasing diameter providing guiding surfaces concentric with the mandrel (see FIGURES 2, 7, 8 and 11). The space between the rings 29 to 34 and the mandrel is unobstructed.

The even-numbered rings 30, 32 and 34 are mounted on stems 35 projecting from the disc 21 in the regions of its extensions 26 and secured thereto by screws with knurled heads 36 (FIGURES 7 and 10). The odd-numbered rings 29, 31 and 33 are mounted on tubular stems 37 (FIGURES 8 and 9) which are slidable in bosses 38 carried by the disc 20 in the regions of its extensions 24 and are screw-threaded internally to receive correspondingly threaded portions 39 of spindles 40 which are journalled in bushes 41 carried by the front plate 11 in the regions of its extenisons 16. There are thus, for each pair of extensions 16 and 24, three spindles 40, one for each of the odd-numbered rings 29, 31 and 33. The spindles of each group are geared together by gear wheels 42 pinned to the spindles between the front plate and the disc 20, and all the groups are geared together by a chain 43 which meshes with sprockets 44 pinned to the outer spindle of each group. The threads of the spindle pertaining to the middle ring 31 of the three are of opposite hand to the other spindles so that the setting in rotation of the intergeared system of spindles, by the handwheel 17 pinned to one of them, causes the three odd-numbered rings 29, 31 and 33 to be advanced or retracted simultaneously in relation to the even-numbered rings 30, 32 and 34 fixed to the disc 21.

Considering the thread guide structure as a whole, the innermost part of the innermost ring 34 defines an aperture through which the mandrel 15 passes, while all the rings 29 to 34 provide annular guide surfaces of convex section, adjacent surfaces being directed in opposite axial directions. When the odd-numbered rings are adjusted to an axial position such as that shown in FIGURES 9 and 10, the threads passing inwardly are deflected by the rings to follow a sinuous course and are thereby tensioned. This is the condition during winding. By turning the handwheel 17, the amount of deflection and therefore the tension may be adjusted, or the odd-numbered rings may be moved so far to the left, as viewed in FIGURES 9 and 10, that threads can be passed in straight paths inwardly between them. This facilitates the initial setting up of the threads before winding on to the mandrel starts, and the slight bending of the thread paths caused by the offsetting of the hexagonal fairleads 28 does not materially affect the ease with which the threads may be passed through the device to the mandrel.

When the mandrel is moving axially to the left, as seen in FIGURES 9 and 10, the threads follow paths such as are shown by the full lines at 45 and do not come into contact with the innermost ring 34, but when the direction of movement of the mandrel reverses, the threads follow the alternative paths indicated by the chain-dotted lines at 46 and are deflected by the innermost ring 34. By arranging the rings 33 and 34 to be tangent to, and to lie on opposite sides of, a common plane normal to the axis, the result obtained is that the tensioning remains the same in both cases since the loss of wrapping angle on one of the rings is equal to the gain in wrapping angle on the other ring In cases where an appreciable range of tensioning adjustment is required it is therefore desirable for the innermost ring 34 to be axially adjustable also.

It will be seen that the guide surfaces of the rings 29, 31 and 33 (that is to say the sides of the rings that make contact with the threads) are tangent to a plane A—A normal to the axis of the mandrel, and the guide surfaces of the rings 30 and 32 are tangent to a plane B—B normal to the axis of the mandrel. The guide surface of the ring 34, as mentioned above, is tangent to the plane A—A. These planes are quite close together, and in particular the radial distance between the radially innermost guide surface on the ring 34 of the thread guide 9 and the radially outermost guide surface on the ring 29 is substantially greater than the distance between the planes A—A and B—B. In consequence, considered in a plane containing the axis (FIGURES 9, 10 and 11), the sinuous part of the path of each of the threads is radial in its general direction. Moreover, the guide means constituted by the fairleads 28, from which the threads pass to the thread guide 9, is adjacent to the planes A—A and B—B.

It will also be seen that each of the rings 30, 31, 32 and 33 is at least as small in diameter as the next outer ring and is at least as great in diameter as the next inner ring. By this means the contact of the threads alternately with guide surfaces facing in opposite directions is obtained.

As mentioned above, it is desirable to apply resin to the threads as they approach the mandrel. To enable this to be done, one of the guide rings which is always in contact with the threads, preferably the ring 32, is made in the form of a hollow tube having a continuous circumferential slit 47 (FIGURES 8, 9, 10 and 11) in the crest of the guide surface which is contacted by the thread. The resin, in the form of a liquid or paste, is fed into the tubular ring through one or more pipe connections 48 (FIGURES 7 and 9), and to assist in spreading the resin over the threads a ring-shaped spreader such as a brush 49 is provided, the bristles of which bear on the ring 32 in the region of the slit. The bristles thus become loaded with the resin and the threads are more thoroughly coated as they are drawn through the bristles. Naturally the continuous slit 47 may be replaced by closely spaced slits or holes in the wall of the tubular ring. The brush 49 may be replaced by a squeegee.

FIGURE 12 shows another thread guide which is also within the scope of the invention. In this thread guide, the four inner rings 31 to 34 of FIGURES 1 to 11 are replaced by rings 56, 55, 60 and 61. A squeegee 54 in the form of a flange of resilient material serves to spread liquid or paste from a slit, slits, or holes in the tubular ring 55. The squeegee is mounted in the ring 56, which presents a guide surface in the form of two convex parts 57, 58 joined by a flat 59. The two innermost rings 60, 61 are of equal diameter and spaced apart a short distance axially. This means that the total angle of embrace around the guide surfaces is not quite the same for the two paths 62 and 63, but enables both rings to be closed to the mandrel.

By making the guide members as rings which are spaced apart radially so that the threads can be seen at several stages of their passage through the device, both the initial setting up of the threads and the supervision of the device during operation are facilitated, but it is not intended that the invention should be limited to such an arrangement, since the guide means on one or both sides of the sheath of threads could be consitituted by a single annulus provided with corrugations encircling the aperture. This is illustrated by FIGURE 13.

FIGURE 13 shows yet another thread guide within the scope of the invention. In this there are only three guide surfaces, 73, 74 and 75, and the surfaces 73 and 75 are parts of a single annular corrugated plate 76. This thread guide does not include means for applying resin to the threads.

While the thread guides described in FIGURES 1 to 11, FIGURE 12 and FIGURE 13 are intended to be mounted upon stationary supports, the same principles may be applied to thread guides which move axially or rotate, or both move axially and rotate. Moreover, the axis of the mandrel and guide may be vertical. FIGURE 14 shows a thread guide adapted to be mounted for rotation about a vertical axis. This axis is not shown, but lies to the right of the section of the thread guide shown in the figure. In this form of thread guide there are four guide surfaces. A liquid or paste-supplying guide member 64 is made in the form of a U-shaped trough having a slit or series of slits or holes 65 in its rounded bottom part 66, which serves as the guide surface, and one or more stationary pipes 67 deliver the liquid or paste into the open side of the trough. The figure shows the free surface of the resin at the inclination which it takes up as a result of centrifugal force. The slits or holes are canted so that centrifugal force aids discharge of the treating material, through the slits or holes. There are two innermost rings 68, 69 which are of equal diameter and are separated by only slightly more than the thickness of the threads, so that the total angles of embrace for the two paths 70, 71 are the same. There is one further guide ring 72.

We claim:

1. In an apparatus for winding a number of threads helically, a thread guide for use with a mandrel surrounded by and coaxial with the thread guide and adapted for relative rotary movement and axial reciprocation therebetween, said thread guide including at least three circumferentially continuous annular guide surfaces, a first two of which are of different diameters and face axially in a first direction, and a third of which faces axially in a second opposite direction and is at least as small in diameter as the greater of the two and at least as great in diameter as the lesser of the two, and is offset axially in the said second direction with respect to at least one of the first two guide surfaces, means to adjust at least one of the guide surfaces in an axial direction with respect to another of the guide surfaces, a support for a number of thread packages, and means, including second guide means, to direct threads from packages carried by the support to the first thread guide, the guide surfaces being each tangent to one of a plurality of planes normal to the axis of the mandrel, the radial distance between the radially innermost and outermost of the guide surfaces being substantially greater than the distance between those of the planes that are furthest apart axially, and the second guide means being adjacent to the planes, whereby threads can be led inwards from said second guide means to the mandrel along sinuous paths in contact with the guide surfaces, the innermost guide surface being spaced at a substantial distance away from the mandrel and the space between said innermost guide surface and the mandrel being unobstructed.

2. In apparatus for winding a number of threads helically, a thread guide for use with a mandrel surrounded by and coaxial with the thread guide and adapted for relative rotary movement and axial reciprocation therebetween, said thread guide including at least two circumferentially continuous annular guide surfaces a first of which faces axially in a first direction, and a second of which faces axially in a second opposite direction, one of the guide surfaces being formed with circumferential slit means, means to supply fluid resin to the slit means, a support for a number of thread packages, and means, including second guide means, to direct thread from packages carried by the support to the first thread guide, the guide surfaces being each tangent to one of a plurality of planes normal to the axis of the mandrel, the radial distance between the radially innermost and outermost of the guide surfaces being substantially greater than the distance between those of the planes that are furthest apart axially, and the second guide means being adjacent to the planes, whereby threads can be led inwards from said second guide means to the mandrel along sinuous paths in contact with the guide surfaces, the innermost circumferentially continuous guide surface being the most inward guiding means of the thread guide.

3. In apparatus as claimed in claim 2, said second guide means being axially fixed on the support, and the threads being led in substantially radially from the second guide means over the guide surfaces.

4. Apparatus for winding a number of threads helically comprising a mandrel, means to rotate and reciprocate the mandrel, a thread guide surrounding and coaxial with the mandrel, said thread guide including at least three circumferentially continuous annular guide surfaces, a first two of which are of different diameters and face axially in a first direction, and a third of which faces axially in a second opposite direction and is at least as small in diameter as the greater of the two and at least as great in diameter as the lesser of the two, and is offset axially in the said second direction with respect to at least one of the first two guide surfaces, means to adjust at least one of the guide surfaces in an axial direction with respect to another of the guide surfaces, a support for a number of thread packages, and means, including second guide means, to direct threads from packages carried by the support to the first thread guide, the guide surfaces being each tangent to one of a plurality of planes normal to the axis of the mandrel, the radial distance between the radially innermost and outermost of the guide surfaces being substantially greater than the distance between those of the planes that are furtherest apart axially, and the second guide means being adjacent to the planes, whereby threads can be led inwards from said second guide means to the mandrel along sinuous paths in contact with the guide surfaces, the innermost guide surface being spaced at a substantial distance away from the mandrel and the space between said innermost guide surface and the mandrel being unobstructed.

5. Apparatus according to claim 1 in which there is circumferential slit means in one of the guide surfaces, and means for supplying a fluid resin to the slit means.

6. Apparatus according to claim 5 in which there is a ring-shaped spreader which bears on the one guide surface in the region of the slit means, for spreading the fluid resin on the threads.

7. Apparatus according to claim 1 in which there is at least one further annular guide surface, coaxial with the said two surfaces and facing said first direction.

8. Apparatus according to claim 1 in which there is at least one further annular guide surface coaxial with said two surfaces and facing said second opposite direction.

9. Apparatus according to claim 1 in which those two of the guide surfaces which are radially innermost are tangent on opposite sides to a common plane normal to the axis.

10. In apparatus as claimed in claim 4, said second guide means being axially fixed on the support, and the threads being led in substantially radially from the second guide means over the guide surfaces.

References Cited by the Examiner
UNITED STATES PATENTS

| 1,103,718 | 7/14 | West | 242—154 |
|---|---|---|---|
| 2,093,206 | 9/37 | Muller | 57—7 |
| 2,714,414 | 8/55 | Ganahl et al. | 156—171 |
| 3,032,461 | 5/62 | Baker et al. | 57—11 X |
| 3,067,803 | 12/62 | Fleury | 156—431 |

MERVIN STEIN, *Primary Examiner.*